US012339784B2

(12) United States Patent
Yefet et al.

(10) Patent No.: US 12,339,784 B2
(45) Date of Patent: Jun. 24, 2025

(54) CACHE MANAGEMENT USING GROUPS PARTITIONING

(71) Applicant: MELLANOX TECHNOLOGIES, LTD., Yokneam (IL)

(72) Inventors: Gal Yefet, Haifa (IL); Yamin Friedman, Haifa (IL); Daniil Provotorov, Tel Aviv (IL); Ariel Shahar, Jerusalem (IL); Natan Oppenheimer, Mitzpe Netofa (IL); Ran Avraham Koren, Beijing (CN); Avi Urman, Yokneam (IL)

(73) Assignee: Mellanox Technologies, Ltd, Yokneam (IL)

( * ) Notice: Subject to any disclaimer, the term of this patent is extended or adjusted under 35 U.S.C. 154(b) by 121 days.

(21) Appl. No.: 17/887,458

(22) Filed: Aug. 14, 2022

(65) Prior Publication Data
US 2024/0012762 A1 Jan. 11, 2024

(30) Foreign Application Priority Data
Jul. 5, 2022 (CN) .......................... 202210793232.1

(51) Int. Cl.
*G06F 12/08* (2016.01)
*G06F 11/34* (2006.01)
(Continued)

(52) U.S. Cl.
CPC .......... *G06F 12/0891* (2013.01); *G06F 11/34* (2013.01); *G06F 12/0846* (2013.01);
(Continued)

(58) Field of Classification Search
CPC ............. G06F 12/0891; G06F 2212/60; G06F 2212/1016; G06F 2212/601; G06F 11/34;
(Continued)

(56) References Cited

U.S. PATENT DOCUMENTS

| 2013/0254491 | A1* | 9/2013 | Coleman | ............... G06F 12/126 711/133 |
| 2018/0225043 | A1* | 8/2018 | Orihara | ................. G06F 3/0631 |

(Continued)

FOREIGN PATENT DOCUMENTS

CN 108668287 A * 10/2018 ............ H04W 16/18

OTHER PUBLICATIONS

Maor, "Understanding the Alpha Parameter in the Buffer Configuration of Mellanox Spectrum Switches," Online Publication, pp. 1-11, Dec. 5, 2018, as downloaded from https://support.mellanox.com/s/article/understanding-the-alpha-parameter-in-the-buffer-configuration-of-mellanox-spectrum-switches).

*Primary Examiner* — Masud K Khan
(74) *Attorney, Agent, or Firm* — Meitar Patents Ltd.; Daniel Kligler

(57) ABSTRACT

An apparatus for cache management includes an interface and a processor. The interface is for communicating with a cache memory configured to store data items. The cache controller is configured to obtain a classification of the data items into a plurality of groups, to obtain respective target capacities for at least some of the groups, each target capacity defining a respective required size of a portion of the cache memory that is permitted to be occupied by the data items belonging to the group, and to cache new data items in the cache memory, or evict cached data items from the cache memory, in accordance with a policy that complies with the target capacities specified for the groups.

12 Claims, 4 Drawing Sheets

(51) Int. Cl.
    *G06F 12/0891*     (2016.01)
    *G06F 12/12*     (2016.01)
    *G06F 12/0846*     (2016.01)
    *G06F 12/0864*     (2016.01)
    *G06F 12/0888*     (2016.01)
    *G06F 12/0895*     (2016.01)
    *G06F 12/126*     (2016.01)
    *G06F 12/128*     (2016.01)

(52) U.S. Cl.
    CPC ...... *G06F 12/0864* (2013.01); *G06F 12/0888* (2013.01); *G06F 12/0895* (2013.01); *G06F 12/126* (2013.01); *G06F 12/128* (2013.01); *G06F 2212/60* (2013.01)

(58) Field of Classification Search
    CPC ............. G06F 12/0846; G06F 12/0864; G06F 12/0895; G06F 12/126; G06F 12/128; G06F 2212/502; G06F 12/0888
    See application file for complete search history.

(56) References Cited

U.S. PATENT DOCUMENTS

| | | | |
|---|---|---|---|
| 2021/0034527 A1* | 2/2021 | Klingauf | G06F 12/0877 |
| 2021/0089449 A1* | 3/2021 | Simionescu | G06F 12/0897 |

* cited by examiner

CACHE MANAGEMENT USING GROUPS PARTITIONING

FIELD OF THE INVENTION

The present invention relates generally to computing and communication systems, and particularly to methods and systems for memory cache management.

BACKGROUND OF THE INVENTION

Data caching is used in a wide variety of computing and communication systems that involve storing data in memory. Caching efficiency is commonly measured in terms of "cache hit rate" or "cache hit probability", indicative of the likelihood that a requested data item will be found in the cache when queried. One of the major factors affecting caching efficiency is the cache eviction policy being used. Commonly used eviction policies include, for example, random eviction, Least Recently Used (LRU) eviction, Least Frequently Used (LFU) eviction and First-In First-Out (FIFO) eviction.

SUMMARY OF THE INVENTION

An embodiment of the present invention that is described herein provides an apparatus for cache management, including an interface and a processor. The interface is for communicating with a cache memory configured to store data items. The cache controller is configured to obtain a classification of the data items into a plurality of groups, to obtain respective target capacities for at least some of the groups, each target capacity defining a respective required size of a portion of the cache memory that is permitted to be occupied by the data items belonging to the group, and to cache new data items in the cache memory, or evict cached data items from the cache memory, in accordance with a policy that complies with the target capacities specified for the groups.

In some embodiments, the data items are associated with memory addresses in a memory, and the groups are associated with respective ranges of the memory addresses. In a disclosed embodiment, the cache controller is configured to maintain respective occupancy counters for at least some of the groups, each occupancy counter indicative of a current size of the portion of the cache memory currently occupied by the data items belonging to the group, and to cache new data items and evict cached data items depending on the occupancy counters.

In some embodiments, in accordance with the policy, the cache controller is configured to prohibit exceeding the target capacities. In other embodiments, in accordance with the policy, the cache controller is configured to permit a defined amount of deviation from the target capacities. In an example embodiment the defined amount of deviation includes a permitted probability of deviation from the target capacities.

In some embodiments, the cache controller is configured to maintain respective validity ratings for the cached data items, and to evict cached data items depending on the validity ratings. In an embodiment, the cache controller is configured to specify respective aging rates for the groups, and to decrement the validity ratings of the cached data items depending on the aging rates specified for the groups. Additionally or alternatively, the cache controller is configured to increment a validity rating of a cached data item in response to a request to access the cached data item.

In some embodiments the apparatus further includes a processor configured to (i) during operation of the apparatus, perform an update to the classification, to an assignment of respective priorities to the cached data items, to at least one of the target capacities, and/or to the policy, and (ii) provide the update to the cache controller.

There is additionally provided, in accordance with an embodiment of the present invention, a method for managing a cache memory configured to store data items. The method includes obtaining a classification of the data items into a plurality of groups, and obtaining respective target capacities for at least some of the groups, each target capacity defining a respective required size of a portion of the cache memory that is permitted to be occupied by the data items belonging to the group. New data items are cached in the cache memory, and/or cached data items are evicted from the cache memory, in accordance with a policy that complies with the target capacities specified for the groups.

The present invention will be more fully understood from the following detailed description of the embodiments thereof, taken together with the drawings in which:

DETAILED DESCRIPTION OF EMBODIMENTS

Overview

Figure 1:
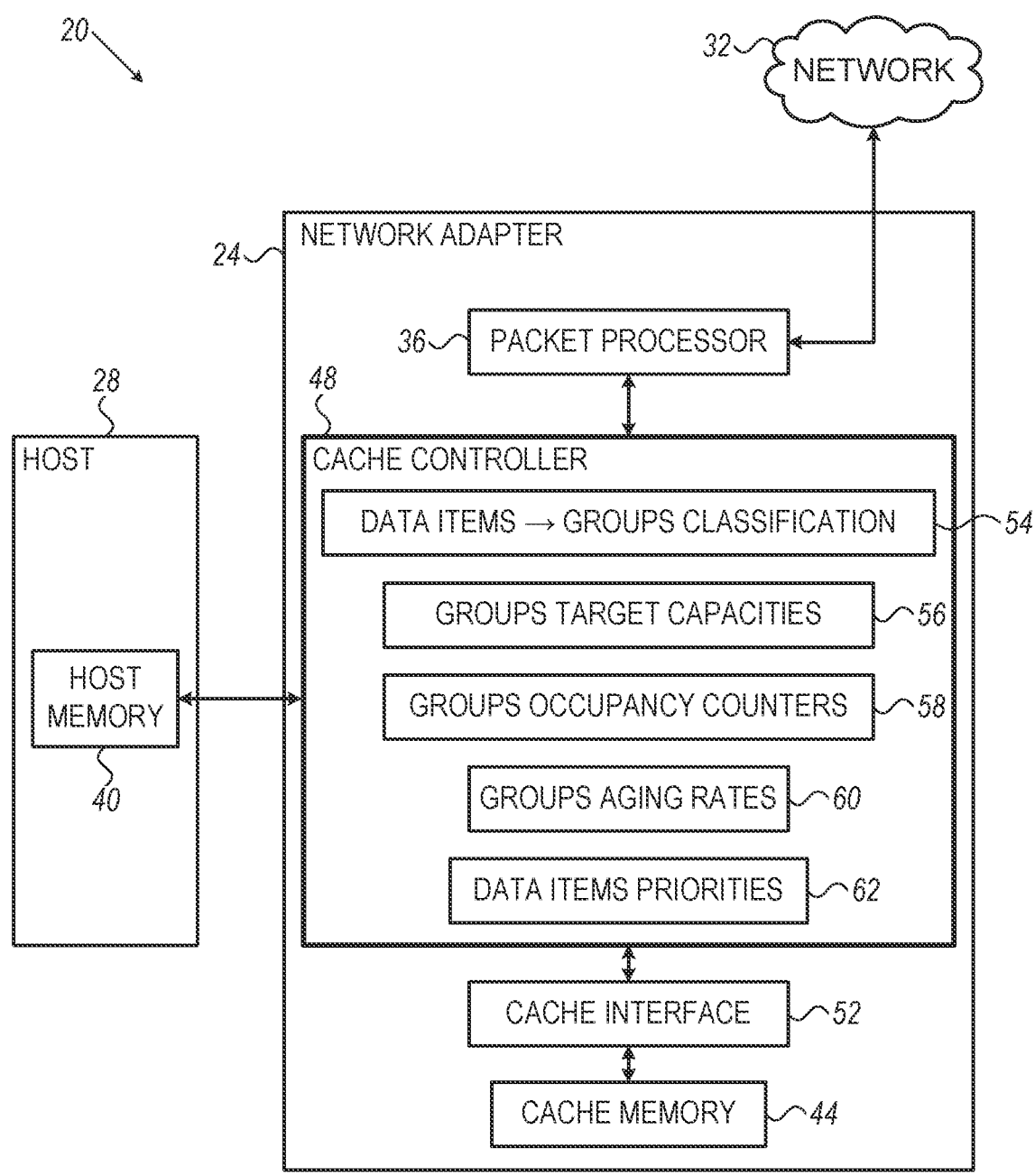
FIG. 1 is a block diagram that schematically illustrates a system employing cache management using groups partitioning, in accordance with an embodiment of the present invention.

In a typical caching scheme, data items are stored in a main memory, and a cache memory is used for caching some of the data items. The main memory and cache memory are referred to herein simply as "memory" and "cache", respectively. The cache is managed by a cache controller. When requested to read a certain address of the memory, the cache controller first queries the cache. If a data item corresponding to the requested address (i.e., a data item that was previously read from the requested address) exists in the cache, the cache controller returns the cached data item as the read result (an event referred to as "cache hit"). If not (an event referred to as "cache miss"), the cache controller reverts to fetch the data item from the memory.

If the cache is not full, the cache controller typically stores the newly fetched data item in the cache for future use. If the cache is full, the cache controller may evict a previously-cached data item in order to store the newly fetched data item, depending on the eviction policy being used. Since the cache size typically enables caching only a small subset of the data items stored in the memory, the eviction policy has a considerable impact on the achievable caching efficiency.

Consider, for example, a cache that is managed using an LRU eviction policy, and a memory access pattern that frequently accesses a large table (larger than the cache size) in a cyclic order, and occasionally accesses other addresses. In this scenario, the LRU eviction policy undesirably evicts any data item belonging to the table before it is read again, causing the cache hit rate to be close to zero. This simple example demonstrates the importance of matching the cache management scheme, and in particular the eviction policy, to the expected memory access pattern.

Embodiments of the present invention that are described herein provide improved cache management schemes that improve caching efficiency in various scenarios, including but not limited to the above example.

In the disclosed embodiments, the data items are classified into multiple groups, e.g., by associating address ranges of the memory to respective groups. Each group, e.g., each address range in the memory, is assigned a respective target capacity in the cache. The target capacity of a group defines the portion of the cache that is permitted to be occupied by data items belonging to the group. The cache controller caches new data items in the cache, and/or evicts cached data items from the cache, in accordance with a policy that complies with the target capacities specified for the groups. (In the description that follows, the term "cached data item" is considered synonymous with "cache line" and the two terms are used interchangeably.)

Caching and eviction in groups is advantageous in various scenarios. In the scenario described above (frequently accessing a large table cyclically, and occasionally accessing other addresses), for instance, the data items associated with the large table can be assigned to a group that occupies only a small fraction of the cache. In this manner, these cached data items ("cache lines"), which have a very low hit probability anyhow, will not cause eviction of cache lines that do not belong to the table and have a much larger hit probability. The overall average hit rate of the cache will therefore increase considerably.

In some embodiments, the cache controller does not permit any deviation from the target capacities of the groups. In these embodiments, if a certain group has exhausted its target capacity, a new data item belonging to the group can be cached only if another data item of the group is evicted. In other embodiments a defined amount of deviation from the target capacities is permitted. For example, the cache controller may permit, with some small probability, caching a data item belonging to a group that exhausted its target capacity, by evicting a data item of a different group.

In some embodiments, the cached data items are also assigned respective priorities, and the cache controller caches and evicts data items according to the priorities. For example, within a given group, the cache controller may refrain from evicting a data item in favor of a data item having a lower priority.

In some embodiments, the cache controller assigns validity ratings to the cached data items, and adapts the validity ratings depending on the activity levels and ages of the data items. In the present context, the term "age of a data item" refers to the time duration that elapsed since the data item was stored in the cache. A recently cached and/or frequently accessed data item will thus have a relatively high validity rating. A data item that is seldom accessed and/or resides in the cache for a long time will have a low validity rating. The cache controller uses the validity ratings to choose which data items to evict. In some embodiments, the cache controller applies different aging rates for different groups, i.e., decrements the validity ratings at different rates for different groups. The validity rating mechanism also enables defining data items as "locked", i.e., prevented from eviction.

In some embodiments, an external processor (e.g., a host served by the cache controller) modifies the partitioning into groups and/or the target capacities adaptively, for example using a suitable Machine Learning (ML) algorithm.

The disclosed techniques can be used in a variety of systems and use-cases that involve caching. An example use case, relating to a network adapter that caches contexts, is described in detail herein.

System Description

FIG. 1 is a block diagram that schematically illustrates a system 20 employing cache management using groups partitioning, in accordance with an embodiment of the present invention. System 20 comprises a network adapter 24 that connects a host 28 to a communication network 32. Among other tasks, network adapter 24 reads data from host 28 and caches some of the data using techniques that are described herein.

In some embodiments host 28 comprises a computer, e.g., a server, which communicates with network adapter 24 over a peripheral bus, e.g., a Peripheral Component Interconnect express (PCIe) bus. In other embodiments, network adapter 24 and host 28 are integrated in a Data Processing Unit (DPU), also sometimes referred to as a "Smart NIC". It is noted that the configuration of system 20 is an example configuration that is chosen purely for the Sake of conceptual clarity. The disclosed techniques are applicable in any other suitable system, application or use-case involving caching of data.

In the example of FIG. 1, network adapter 24 comprises a packet processor 36 that sends and receives packets (e.g., Ethernet or InfiniBand packets) to and from network 32. Processing of the packets may involve reading various contexts from a host memory 40 in host 28. The contexts may comprise, for example, contexts associated with the flows to which the packets belong, contexts associated with the hardware units that process the packets in packet processor 36, or any other suitable type of contexts.

Network adapter 24 further comprises a cache memory 44 for caching a subset of the contexts for faster access by the packet processor. A cache controller 48 is network adapter 24 manages cache 44 using techniques that are described herein. Cache controller 48 communicates with cache 44 using a cache interface 52. The various tasks of cache controller 48 may be implemented in hardware, in software, or using a combination of hardware and software.

The description that follows refers to contexts as "data items". As noted above, the disclosed techniques are not limited to caching of contexts and can be used for caching any other suitable type of data items. A data item (e.g., a context) that is cached in cache 44 is also referred to as a "cache line". In some embodiments, cache 44 is a set-associative cache, having multiple sets and multiple ways. Further aspects of implementing the disclosed techniques in a set-associative cache are addressed further below, with reference to FIG. 4.

As will be described in detail below, in some embodiments cache controller 48 classifies the data items into multiple groups, and performs caching and eviction within the groups. For this purpose, the cache controller obtains (i) a classification 54 that classifies the data items into the groups, and (ii) a list of target capacities 56 assigned to the respective groups. Classification 54 and target capacities 56 may be obtained in various ways, e.g., defined internally by the cache controller, or defined externally, e.g., by host 28 and provided to the cache controller.

Cache controller 48 further maintains a set of occupancy counters 58. Each occupancy counter 58 corresponds to a respective group and tracks the number of data items belonging to the group that are currently cached in cache 44. Typically, when storing a new data item in cache 44, cache controller 48 increments the occupancy counter of the group to which the data item belongs. When evicting a data item from cache 44, cache controller 48 typically decrements the occupancy counter of the group to which the data item belongs. When the occupancy counter of a group reaches the target capacity of the group, the group is regarded as having exhausted its target capacity.

In some embodiments, cache controller 48 also holds a set of aging rates 60 defined for the various groups. In some embodiments, cache controller 48 further assigns priorities 62 to the cached data items. The cache controller uses the aging mechanism and/or priorities for choosing data items for eviction. These features are addressed in detail below.

The configurations of system 20 and its various components, e.g., network adapter 24 and host 28, as shown in FIG. 1, are example configurations that are chosen purely for the sake of conceptual clarity. Any other suitable configurations can be used in alternative embodiments. For example, in alternative embodiments cache memory 44 may be external to network adapter 24. Generally, cache memory 44 may be located at any suitable location.

In various embodiments, the various components of system 20, e.g., network adapter 24 and host 28, can be implemented using hardware, e.g., using one or more Application-Specific Integrated Circuits (ASIC) and/or Field-Programmable Gate Arrays (FPGA), using software, or using a combination of hardware and software components. Host memory 40 and cache memory 44 may be implemented using any suitable type of memory, e.g., Random Access Memory (RAM).

In some embodiments, certain elements of system 20, e.g., some or all functions of cache controller 48, or some or all functions of host 28, may be implemented using one or more general-purpose processors, which are programmed in software to carry out the functions described herein. The software may be downloaded to any such processor in electronic form, over a network, for example, or it may, alternatively or additionally, be provided and/or stored on non-transitory tangible media, such as magnetic, optical, or electronic memory.

Cache Management Using Groups Partitioning

For the purpose of cache management, at least some of the data items stored in host memory 40 are classified into multiple groups, as specified in classification 54. In the description that follows the classification is based on addresses in host memory 40 (virtual addresses in some embodiments, physical addresses in other embodiments). Generally, however, any other suitable type of classification can be used, e.g., according to the identity of the requester, according to a parameter in the request, or according to an "era" (time period) during which the request was generated. Cache controller 48 stores and evicts data items per group, using a policy that complies with target capacities 56 defined for the groups.

Figure 2:
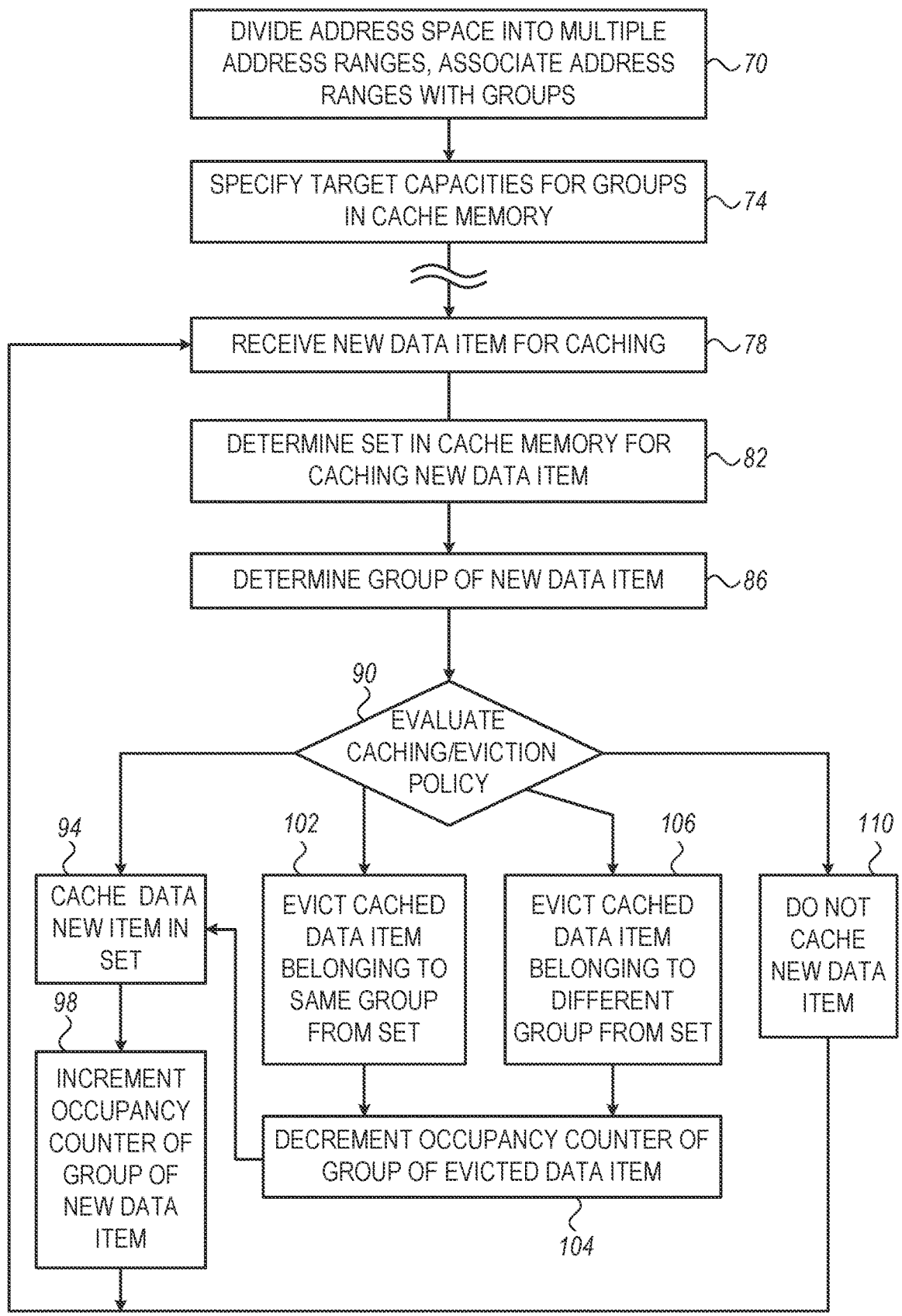
FIG. 2 is a flow chart that schematically illustrates a method for cache management using groups partitioning, in accordance with an embodiment of the present invention.

FIG. 2 is a flow chart that schematically illustrates a method for cache management using groups partitioning, in accordance with an embodiment of the present invention. In the present example, cache controller 48 manages cache 44 as a set-associative cache. As such, cache 44 is divided into multiple sets. Each set comprises multiple cache-lines, referred to as "ways". Upon receiving a new data item for caching, cache controller 48 maps the new data item to one of the sets using a suitable hashing function, and caches the data item (if possible) in one of the cache lines (ways) of that set. Depending on the caching/eviction policy being used, if the set does not have any empty ways, the cache controller may evict a currently-cached data item from one of the ways in order to cache the new data item.

The method of FIG. 2 begins with cache controller 48 (or some external processor) dividing at least part of the address space of host memory 40 into multiple address ranges, and associating the address ranges with respective groups, at a partitioning stage 70. The partitioning and association are expressed in classification 54. At a capacity setting stage 74, cache controller 48 (or some external processor) specifies a respective target capacity for each group.

At some point in time, cache controller 48 receives a new data item for caching in cache 44, at a data-item reception stage 78. Typically, a new data item is received for caching in response to a cache miss, i.e., after (i) packet processor 36 requesting this data item, and (ii) cache controller 48 determining that the data item does not exist in cache 44.

At a set identification stage 82, cache controller 48 identifies, from among the multiple sets in cache 44, the set in which the new data item is to be cached. The cache controller typically determines the set by calculating a hashing function over the new data item. At a group identification stage 86, cache controller 48 queries classification 54 to identify the group to which the new data item belongs.

At a caching/eviction decision stage 90, cache controller 48 decides whether and how to cache the new data item, based on the caching/eviction policy being used. The decision may depend on various factors, such as the occupancy of the relevant set in cache 44, the amount of spare capacity remaining in the group to which the new data item belongs, and the like. Cache controller 48 can determine the amount of spare capacity in a given group by comparing the group's occupancy counter 58 to the group's target capacity 56.

In the present embodiment, cache controller 48 may reach the following decisions and perform the following actions:
- Cache the new data item in an available empty way in the set, at a caching stage 94. This decision is taken if the set currently comprises at least one empty way. The cache controller then increments occupancy counter 58 of the group to account for the newly added data item, at an occupancy incrementing stage 98. The method then loops back to stage 78 above.
- Evict from the set a previously-cached data item belonging to the same group as the new data item, at a same-group eviction stage 102. This decision may be taken, for example, if (i) the set has no empty ways, and (ii) the group of the new data item has only a small spare capacity. Cache controller 48 decrements the occupancy counter of the group to which the evicted data item belongs, at an occupancy decrementing stage 98. The method then proceeds to stage 94 for caching the new data item in the vacated way.
- Evict from the set a previously-cached data item belonging to a different group (different from the group of the new data item), at a different-group eviction stage 106. This decision may be taken, for example, with a certain small probability, when using "soft partitioning" as defined further below. Cache controller 48 decrements the occupancy counter of the group to which the evicted data item belongs, at occupancy decrementing stage 98. The method then proceeds to stage 94 for caching the new data item in the vacated way.

Do not cache the new data item, at a caching failure stage 110. This decision may be taken, for example, when using "hard partitioning" (defined further below) and the target capacity of the group of the new data item is exceeded. When using "soft partitioning" and exceeding the target capacity of the new data item, this decision would be taken with a certain (large) probability. The method then loops back to stage 78 above.

Typically, when deciding to evict a previously-cached data item from the set (at stage 102 or 106), the cache controller selects the data item having the lowest validity rating among the candidate data items.

In one example implementation, the partitioning into groups (stage 70) is performed in software, so as to greater flexibility in defining and possibly adapting the partitioning using various suitable algorithms. Subsequent stages, e.g., from stage 82 onwards, are performed in the present example using hardware in order to maximize speed and throughput. In this implementation, the hardware receives the new data item from the software with the data item already tagged with its group number.

The method flow of FIG. 2 is an example flow that is chosen purely for the sake of conceptual clarity. In alternative embodiments, cache controller 48 may carry out the disclosed techniques using any the suitable flow.

For example, in the embodiment of FIG. 2 cache controller 48 does not permit any deviation from the target capacities specified for the groups. In this embodiment, when a group has reached its target capacity, a new data item belonging to the group can only be cached in return for evicting another data item in the group. This policy is referred to herein as "hard partitioning".

In an alternative embodiment, adherence to the target capacities may be less strict. For example, cache controller 48 may permit, with some small probability p, caching a new data item belonging to a group (referred to as "first group") that exhausted its target capacity, by evicting a data item of a different group (referred to as "second group"). This policy is referred to herein as "soft partitioning". In an example implementation, the cache controller generates a pseudo-random number x, $0 \leq x \leq 1$. If $x<p$, the cache controller evicts a data item from the second group and caches the new data item. If $x \geq p$, the cache controller evicts a data item from the first group, before caching the new data item. The cache controller may set the value of the probability p to any suitable value, fixed or adaptive.

In one embodiment, the cache controller sets the probability p depending on the occupancy of the first group. When the occupancy of the first group is high, p will typically be set to a small value. When the occupancy of the first group is low, p can be set to a higher value. In another embodiment, for a given set in the cache, a specific priority is defined for each group. In this embodiment, cache controller 48 uses a separate probability p to evict each cache line in the set, depending on the group to which this cache line belongs. For example, the cache controller can use a high probability if the target capacity of the group is exceeded, and a lower probability otherwise.

In some embodiments, an external processor (e.g., host 28) modifies the partitioning into groups and/or the target capacities adaptively. Any suitable algorithm, for example a Machine Learning (ML) algorithm or a non-ML algorithm, can be used for this purpose. In one example of a ML algorithm, a Reinforced Learning (RL) agent may attempt maximizing the cache hit rate, with a freedom to change the memory partitioning into groups and the capacities of the groups. One example of a non-ML algorithm may use static-dynamic partitioning, as described, for example, in "Understanding the Alpha Parameter in the Buffer Configuration of Mellanox Spectrum Switches," Ophir Maor, December, 2018. Such an algorithm chooses an "alpha" parameter for each group. The alpha parameter is indicative of the amount of space a specific active group can allocate from the free space of the buffer. Alternatively, any other suitable adaptation or optimization algorithm can be used.

Validity Ratings and Per-Group Aging Mechanism

In some embodiments, cache controller 48 applies an eviction policy that tracks the ages and activity levels of the various data items cached in cache 44, and chooses old and/or rarely-accessed data items as candidates for eviction. In an embodiment, the cache controller maintains a respective "validity rating" for each cached data item. The cache controller decrements the validity ratings of the data items over time, e.g., every predefined time interval (referred to as an "aging interval"). In this manner, the validity rating of a given data item is indicative of the age of the data item in the cache. The rate at which the cache controller decrements the validity ratings may differ from one group to another.

In addition, the cache controller increases the validity of a data item when the item is accessed, so that the validity ratings are also indicative of the activity levels of the cached data items.

In one example embodiment, cache controller 48 uses the following set of validity ratings:

| | |
|---|---|
| "0" | Invalid |
| "1" | Valid and waiting for eviction |
| "2" | Valid, but will be waiting for invalidation in next iteration |
| "3"-"5" | Valid |
| "6" | Reserved |
| "7" | Locked |

The validity rating of each data item (three bits in the present example) is typically stored in cache 44 along with the data item itself. In a typical example, cache controller 48 assigns an initial validity rating of "3" to newly cached data items. From that point, cache controller decrements the validity ratings over time, and increments validity levels of data items being accessed.

Figure 3:
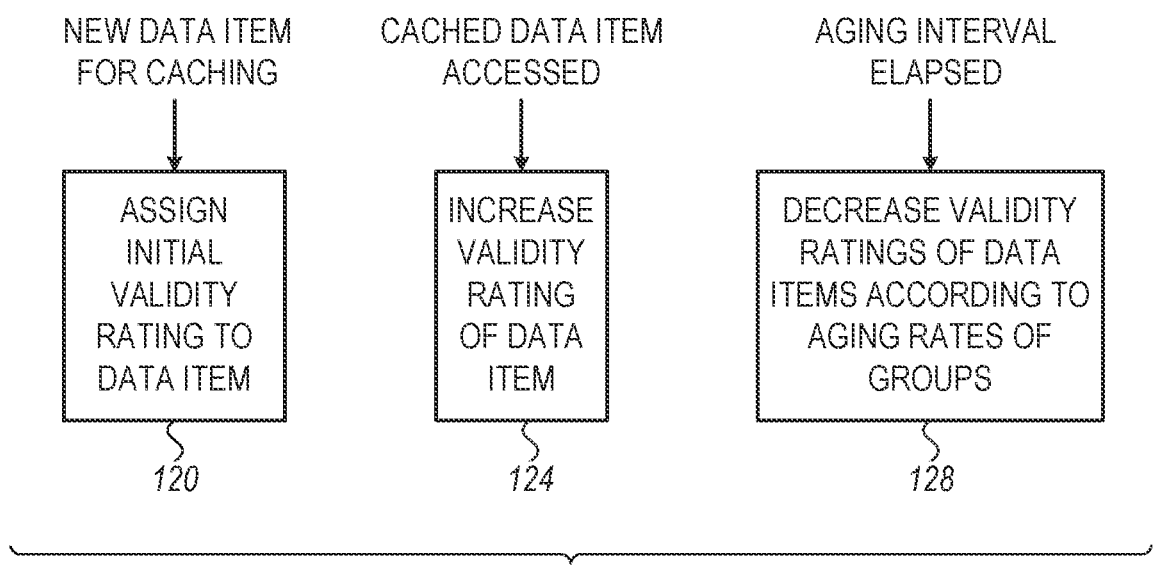
FIG. 3 is a flow chart that schematically illustrates a method for maintaining validity ratings of cached data items, in accordance with an embodiment of the present invention.

FIG. 3 is a flow chart that schematically illustrates a method for maintaining validity ratings of cached data items, in accordance with an embodiment of the present invention. Initially, cache controller 48 (or some external processor) specifies aging rates for the various groups (e.g., aging rates 60 of FIG. 1). The aging rate of a given group may be specified, for example, as the amount by which the validity ratings of the data items in the group should be decreased on every aging interval. In an example embodiment, the aging rate of a given group may be chosen based on the current occupancy of the group. When using this feature, data items of higher-occupancy groups may be set to age more quickly than data items of lower-occupancy groups.

The method of FIG. 3 comprises three separate processes that are carried out in parallel and are triggered by different triggers:

In response to receiving a new data item for caching, the cache controller assigns the new data item an initial validity rating (e.g., "3"), at an initial assignment stage 120.

In response to identifying that a previously-cached data item has been accessed (e.g., read or written), the cache controller increases the validity rating of the accessed data item, at a validity increasing stage 124.

In response to identifying that the current aging interval has elapsed, the cache controller decrements the validity ratings of the various cached data items, at a validity decreasing stage 128. Typically, the cache controller decreases the validity ratings of the data items of each group by a value that depends on the aging rate 60 defined for the group.

IMPLEMENTATION EXAMPLE—SET-ASSOCIATIVE CACHE

Figure 4:
FIG. 4 is a diagram that schematically illustrates an example content of a set-associative cache that is managed using groups partitioning, in accordance with an embodiment of the present invention.

FIG. 4 is a diagram that schematically illustrates an example content of cache 44 that is managed as a set-associative cache using groups partitioning, in accordance with an embodiment of the present invention.

Cache 44 in the present example comprises thirty-two sets (numbered 0-31) and eight ways (numbered 0-7). Thus, each set is capable of caching up to eight data items (cache lines). When using the disclosed techniques, each cached data item is associated with a certain group. The cache lines are marked in the figure with their respective group indices (in the present example eight groups denoted "#0" through "#7").

As described above with reference to FIG. 2, upon receiving a new data item for caching, cache controller 48 typically maps the new data item to one of the sets using a suitable hashing function. If the set has one or more empty cache lines, the cache controller stores the new data item in one of them. If not, the cache controller checks whether any of the previously cached data items in the set should be evicted in favor of the new data item. If so, the cache controller evicts the previously cached data item, and stores the new data item in its place.

Cache controller 46 may perform eviction and caching in accordance with any of the techniques described above. For example, when using "hard partitioning" (as defined above), a new data item can be stored in the cache only if the set contains either (i) an empty cache line, or (ii) a cache line belonging to the same group as the new data item. In an embodiment, if the set comprises multiple cache lines belonging to the same group as the new data item, the cache controller may evict the cache line having the lowest validity among them. When using "soft partitioning" (as defined above), a cache line of a different group can be evicted with some probability.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for cache management, comprising:
   an interface for communicating with a cache memory to store data items; and
   a cache controller, to:
      obtain a classification of the data items into a plurality of groups;
      obtain respective target capacities for at least some of the groups, each target capacity defining a respective required size of a portion of the cache memory that is permitted to be occupied by the data items belonging to the group; and
      cache new data items in the cache memory, or evict cached data items from the cache memory, in accordance with a policy that (i) complies with the target capacities specified for the groups but (ii) permits, with a defined probability, caching a first data item belonging to a first group that exhausted its target capacity, by evicting a second data item belonging to a second group, different from the first group.

2. The apparatus according to claim 1, wherein the data items are associated with memory addresses in a memory, and wherein the groups are associated with respective ranges of the memory addresses.

3. The apparatus according to claim 1, wherein the cache controller is to:
   maintain respective occupancy counters for at least some of the groups, each occupancy counter indicative of a current size of the portion of the cache memory currently occupied by the data items belonging to the group; and
   cache new data items and evict cached data items depending on the occupancy counters.

4. The apparatus according to claim 1, wherein, in accordance with the policy, the cache controller is to prohibit exceeding one or more of the target capacities.

5. The apparatus according to claim 1, wherein the cache controller is to increment a validity rating of a cached data item in response to a request to access the cached data item.

6. The apparatus according to claim 1, further comprising a processor to:
   during operation of the apparatus, perform an update to one or more of (i) the classification (ii) an assignment of respective priorities to the cached data items, (iii) at least one of the target capacities, and (iv) the policy; and
   provide the update to the cache controller.

7. A method for managing a cache memory configured to store data items, the method comprising:
   obtaining a classification of the data items into a plurality of groups;
   obtaining respective target capacities for at least some of the groups, each target capacity defining a respective required size of a portion of the cache memory that is permitted to be occupied by the data items belonging to the group;
   caching new data items in the cache memory, or evicting cached data items from the cache memory, in accordance with a policy that (i) complies with the target capacities specified for the groups but (ii) permits, with a defined probability, caching a first data item belonging to a first group that exhausted its target capacity, by evicting a second data item belonging to a second group, different from the first group.

8. The method according to claim 7, wherein the data items are associated with memory addresses in a memory, and wherein the groups are associated with respective ranges of the memory addresses.

9. The method according to claim 7, wherein caching and evicting the data items comprise:
- maintaining respective occupancy counters for at least some of the groups, each occupancy counter indicative of a current size of the portion of the cache memory currently occupied by the data items belonging to the group; and
- caching new data items and evicting cached data items depending on the occupancy counters.

10. The method according to claim 7, wherein caching and evicting the data items comprise, in accordance with the policy, prohibiting exceeding one or more of the target capacities.

11. The method according to claim 7, further comprising incrementing a validity rating of a cached data item in response to a request to access the cached data item.

12. The method according to claim 7, further comprising:
- during operation, performing an update to one or more of (i) the classification (ii) an assignment of respective priorities to the cached data items, (iii) at least one of the target capacities, and (iv) the policy; and
- continuing caching and eviction of the data items in accordance with the update.

* * * * *